Patented Oct. 18, 1932

1,883,718

UNITED STATES PATENT OFFICE

ERNEST F. GRETHER, OF MIDLAND, MICHIGAN

FERTILIZER COMPOSITION

No Drawing.   Application filed January 28, 1929.   Serial No. 335,742.

The present invention relates to fertilizer compositions, and in particular to such compositions suitable for direct application to the soil wherein the active ingredients, nitrogen, phosphorus and/or potassium are present in relatively concentrated but slowly available form.

A large number of compounds containing one or more of the elements nitrogen, phosphorus and potassium in combination in more or less highly concentrated completely available form have been proposed and used for fertilizers, such as ammonium nitrate, ammonium phosphate, potassium nitrate, etc. Such compounds generally are characterized by being easily soluble in water so that they can be applied with safety to the soil about growing plants only when in very dilute solution. Owing to their solubility, the aforesaid compounds, when added to the soil, are rapidly leached away by the ground water, so that, while they often have a pronounced beneficial effect when first applied, the effect is not lasting and may disappear entirely in a comparatively short time. The use of such materials, therefore, requires skill and careful attention, so that just the proper dosage will be given, and applications must be frequently repeated if a permanent soil improvement is desired. There is likewise much waste of the fertilizer material which is dissolved and carried away by the ground water before it can be absorbed by the plant roots. Still another objection is that some of these same compounds are more or less deliquescent, rapidly absorbing moisture from the air, so that they cannot be stored in the usual containers, but must be carefully protected from contact with the air if deterioration and loss is to be avoided.

By repeated experiments, carried out over an extended period of years, I have found certain compounds, containing one or more of the aforesaid active elements in relatively large proportions, such compounds being only slightly and gradually, but eventually completely, soluble in water. The aforesaid compounds may be applied as fertilizers in solid form directly to the soil with highly beneficial effect and without need for any particular care to avoid overdosing and consequent injury to growing plants. The fertilizing constituents of these compounds are very gradually released, apparently at about such rate as plant roots may readily absorb them, and the effects of one application, while becoming evident in a relatively short time, will endure for months and, in fact, have been observed the second year after application. It is evident from the foregoing that the employment of fertilizer materials of the present character possesses great advantages for many purposes over the usual commercial fertilizers as at present available. It is among the objects of this invention to provide improved fertilizer compositions by suitable admixture of various compounds of the character herein described.

To the accomplishment of the foregoing and related ends, the invention, then, consists of the ingredients and combinations thereof hereinafter fully described and particularly pointed out in the claims, the following description setting forth in detail various approved combinations of such ingredients, said combinations, however, constituting but a few of the various ways in which the principle of the invention may be used.

I have found that magnesium ammonium phosphate, $MgNH_4PO_4$, which has two stable crystalline forms containing, respectively, one and six molecules of water of crystallization, is a particularly effective fertilizer ingredient of the type herein referred to, containing a relatively high concentration of available phosphorus, and somewhat less of ammonia. This compound is only slightly soluble in water, its solubility being appreciably increased, however, in a slightly acid medium such as ground water containing $CO_2$ in solution. It may be applied in solid form as a fertilizer directly to the soil without danger of overdosing or injuring plant growth. I have observed that its stimulative effect for increasing growth is marked and while such effect may set in gradually, it continues for a very long time. Apparently, the plant food is released by solution at about the rate plant roots normally can absorb it.

There is no danger of adding an injurious amount at one time, and one application may be made in quantity sufficient to last throughout the entire season of growth. I have found the aforesaid compound to be a most valuable fertilizer, which may be used with or without admixture with other fertilizer materials, and with or without dilution with inert ingredients.

In complete fertilizer compositions, in order to supply potash as well as an added amount of nitrogen, it is desirable to incorporate other substances which likewise have the property of being very gradually but eventually completely soluble in water. For supplying the additional nitrogen I prefer to use methylene urea, a compound formed by reacting upon urea with formaldehyde, and having the formula $CO(NH)_2:CH_2$. A similar compound, ethylidene urea, is produced when acetaldehyde, instead of formaldehyde, is reacted with urea. The aforesaid urea derivatives are sparingly soluble in water, in this respect differing from urea itself, or urea nitrate, which are both highly water-soluble and therefore unsuitable for my purpose. I have found such aldehyde urea derivatives to be distinctly promotive of plant growth, in this and other ways acting in much the same manner, when used as fertilizer, as already described with reference to magnesium ammonium phosphate. Furthermore methylene urea particularly possesses the added advantage of liberating formaldehyde slowly as it is decomposed in the soil, the latter compound serving as a soil purifier and disinfectant to destroy harmful organisms which often are present and are the cause of various diseases of plants. To supply the potash content I prefer potassium meta-phosphate, $KPO_3$, likewise a slowly soluble substance which contains a high percentage of available potash and phosphorus, and exhibits marked fertilizing activity. The latter compound may be prepared by fusing mono-potassium phosphate, $KH_2PO_4$.

In addition to the above-named active ingredients containing nitrogen, phosphorus and potash, I have also found it advantageous to include a small amount of sulphur in my complete fertilizer composition. When mixed with the soil, sulphur is promptly oxidized and when so oxidized appears to aid in the solution of the other slowly soluble ingredients. It also exercises a beneficial function in the soil on account of its fungicidal properties.

As an example of a composition of the herein described character, I may take the following:

200 parts magnesium ammonium phosphate ($MgNH_4PO_4.H_2O$),
55 parts potassium metaphosphate,
35 parts methylene urea,
10 parts flowers of sulphur.

The ingredients are thoroughly mixed in any suitable manner. Such composition contains approximately 12.7 per cent $NH_3$, 41.2 per cent $P_2O_5$, 7.2 per cent $K_2O$.

Another composition may consist of: 100 parts magnesium ammonium phosphate, 100 parts methylene urea, 100 parts potassium metaphosphate, with a small amount of sulphur; the mixture containing about 19.4 per cent $NH_3$, 35.4 per cent $P_2O_5$ and 13.3 per cent $K_2O$.

It is evident, however, that the proportions given in the foregoing examples may be varied widely without departing from the spirit of my invention. Likewise useful mixtures may be compounded from any two or three of the above mentioned ingredients. If desired, inert ingredients may be added to increase the bulk of the mixture or for other purposes. Further, one or more of the herein disclosed compounds, or mixtures thereof, may be added to other fertilizer materials, if desired. Therefore the invention is intended to comprise a fertilizer composition containing any of the above named ingredients or combinations of two or more of them, or the equivalent thereof.

I may also include in my fertilizer composition, if desired, a relatively small amount of a metallic compound that is capable of functioning as a soil catalyst or promoter, such as an oxide or hydroxide of one or more of the metals copper, manganese, cobalt or nickel. An amount of from 0.1 to 1 per cent thereof usually is sufficient. Such metallic oxide may best be incorporated and uniformly distributed throughout the mass of the complete fertilizer by dissolving a sufficient quantity of a soluble salt of such metal in the solution of magnesium salt from which the magnesium ammonium phosphate is precipitated, the metallic compound being included in the precipitate. It may, however, be incorporated in any other way, if desired.

A product compounded of the above mentioned ingredients combines the properties of a concentrated fertilizer with those of a soil purifier. Such product may be applied directly to the soil about growing plants, even in relatively large amount, without any injurious effect whatever. In the soil it remains effective for an extended period of time until practically all of the amount applied has been utilized for the intended purpose as fertilizer, waste of material through leaching away being reduced to a minimum. It is readily prepared in a finely divided form suitable for application, easily applied and, being non-deliquescent, can be stored in the usual containers without deterioration, caking or lumping.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. A fertilizer composition including magnesium ammonium phosphate and methylene urea.

2. A fertilizer composition comprising magnesium ammonium phosphate and methylene urea together with a relatively small amount of sulphur.

3. A fertilizer composition comprising magnesium ammonium phosphate and methylene urea together with a relatively small amount of sulphur and of a metallic compound adapted to function as a soil catalyzer.

4. A fertilizer composition comprising magnesium ammonium phosphate and methylene urea together with a relatively small amount of sulphur and of an oxide or hydroxide of at least one of the metals copper, manganese, nickel, and cobalt.

Signed by me this 22nd day of January, 1929.

ERNEST F. GRETHER.